United States Patent [19]
Lee

[11] Patent Number: 5,737,449
[45] Date of Patent: Apr. 7, 1998

[54] APPARATUS FOR ENCODING A CONTOUR OF REGIONS CONTAINED IN A VIDEO SIGNAL

[75] Inventor: Min-Sup Lee, Seoul, Rep. of Korea

[73] Assignee: Daewoo Electronics, Co., Ltd., Seoul, Rep. of Korea

[21] Appl. No.: 580,237

[22] Filed: Dec. 28, 1995

[30] Foreign Application Priority Data

Dec. 29, 1994 [KR] Rep. of Korea ............... 94-38606

[51] Int. Cl.$^6$ .................. G06K 9/36; G06K 9/48
[52] U.S. Cl. ............ 382/242; 382/236; 382/250; 358/433
[58] Field of Search ............... 348/402, 407, 348/412, 413, 416, 431; 382/173, 180, 232, 236, 238, 242, 294

[56] References Cited

U.S. PATENT DOCUMENTS

| | | | |
|---|---|---|---|
| 3,632,865 | 1/1972 | Haskell et al. | 348/416 |
| 4,703,350 | 10/1987 | Hinman | 348/402 |
| 5,537,155 | 7/1996 | O'Connell et al. | 348/416 |
| 5,557,341 | 9/1996 | Weiss et al. | 348/412 |
| 5,594,813 | 1/1997 | Fandrianto et al. | 382/236 |
| 5,598,215 | 1/1997 | Watanabe | 348/416 |
| 5,608,458 | 3/1997 | Chen et al. | 348/413 |

*Primary Examiner*—Joseph Mancuso
*Assistant Examiner*—Timothy M. Johnson
*Attorney, Agent, or Firm*—Pennie & Edmonds LLP

[57] ABSTRACT

An apparatus for encoding a contour of regions contained in a video signal comprises first and second segmentation blocks for segmenting previous and current frame into a number of regions to generate previous and current contours, a prediction parameter calculation block for generating prediction parameters based on the previous and current contours, and the previous and current frames, a contour prediction block for constructing a predicted current contour by transforming the previous contour based on the prediction parameters, an error detection block for detecting deviation points lying on portions of the predicted current contour that deviate from the current contour, thereby generating the deviation points and corresponding displacements to the deviation points, and a contour coder for encoding the deviation points and the displacements together with the prediction parameters.

6 Claims, 5 Drawing Sheets

VERTEX POINT

APPARATUS FOR ENCODING A CONTOUR OF REGIONS CONTAINED IN A VIDEO SIGNAL

FIELD OF THE INVENTION

The present invention relates to an apparatus for encoding a video signal; and, more particularly, to an apparatus capable of effectively encoding a contour of regions contained in a video signal, thereby reducing the amount of data to be transmitted.

DESCRIPTION OF THE PRIOR ART

In digital video systems such as video-telephone, teleconference and high definition television, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially, in the case of such low bit-rate video signal codec(coding-decoding) systems as video-telephone and teleconference apparatus.

One of such methods for encoding video signals for a low bit-rate encoding system is the so-called region-based coding technique employing a region-based segmentation approach.

In the region-based coding technique, various regions in an image that have similar features are identified, and similar adjacent regions are merged sequentially until the remaining adjacent regions become sufficiently different, thereby producing a limited number of distinct segmented regions of the image. Thereafter, a contour for the segmented regions is extracted or defined by using a feature extraction process, wherein the contour provides boundary or contour information for tracing the boundary of the segmented regions, the boundary information including position data of the pixels along the boundary of the regions in the image. The extracted contour may be then coded by using various coding techniques. And, the texture information representing a mean gray level of the pixels included in each of the segmented regions is coded.

A classical coding method for representing the contour information is chain coding. The chain coding method, however, requires a substantial amount of bits for the representation thereof, although there is no loss in the contour information.

Accordingly, there have been proposed several improved methods to encode contour information such as polygonal approximation and B-spline approximation. One of the disadvantages in the polygonal approximation is the rough representation of the contour. The B-spline approximation is, on the other hand, capable of representing the contour more precisely; however, it requires a high-order polynomial to reduce the approximation error, thereby increasing the overall computational complexity of the video encoder.

One of the techniques introduced to ameliorate the problems associated with the rough representation of the contour and the computational complexity in the above approximation approaches is a contour approximation method employing a discrete sine transform (DST).

In an apparatus which adopts the contour approximation technique based on the polygonal approximation and the DST, a number of vertex points are determined and the contour of an object is approximated through the use of a polygonal approximation for fitting the contour by line segments. And, N sample points for each line segment are selected and an approximation error at each of the N sample points located on each line segment is sequentially calculated in order to obtain a set of approximation errors for each line segment. The N sample points are equi-spaced on each line segment and each of the approximation errors represents the distance between each of the N sample points and the contour. Thereafter, sets of DST coefficients are generated by performing one-dimensional DST operation on each set of approximation errors.

Even though it is possible to remedy the rough representation and computational complexity, and reduce the volume of transmission data through the use of the aforementioned DST based contour approximation, it still remains desirable to further reduce the volume of transmission data in order to successfully implement a low-bit rate codec system having, e.g., a 64 kb/s transmission channel bandwidth.

SUMMARY OF THE INVENTION

It is, therefore, a primary object of the invention to provide an improved apparatus for encoding a contour of regions in a video signal, which is capable of further reducing the amount of transmission data.

In accordance with the invention, there is provided an apparatus for encoding a contour of regions contained in a video signal, the video signal having a plurality of frames including a current frame and a previous frame, which comprises: a first segmentation block for segmenting the previous frame into a number of regions to generate a previous contour; a second segmentation block for segmenting the current frame into a number of regions to generate a current contour; a prediction parameter calculation block for generating prediction parameters based on the previous and the current contours, and the previous and the current frames; a contour prediction block for constructing a predicted current contour by transforming the previous contour based on the prediction parameters; an error detection block for detecting deviation points lying on portions of the predicted current contour that deviate from the current contour, to thereby generate the deviation points and corresponding displacements to the deviation points, wherein each of the displacements represents a minimum distance in a horizontal direction between each of the deviation points and the current contour; and a contour coder for encoding the deviation points and the displacements together with the prediction parameters.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
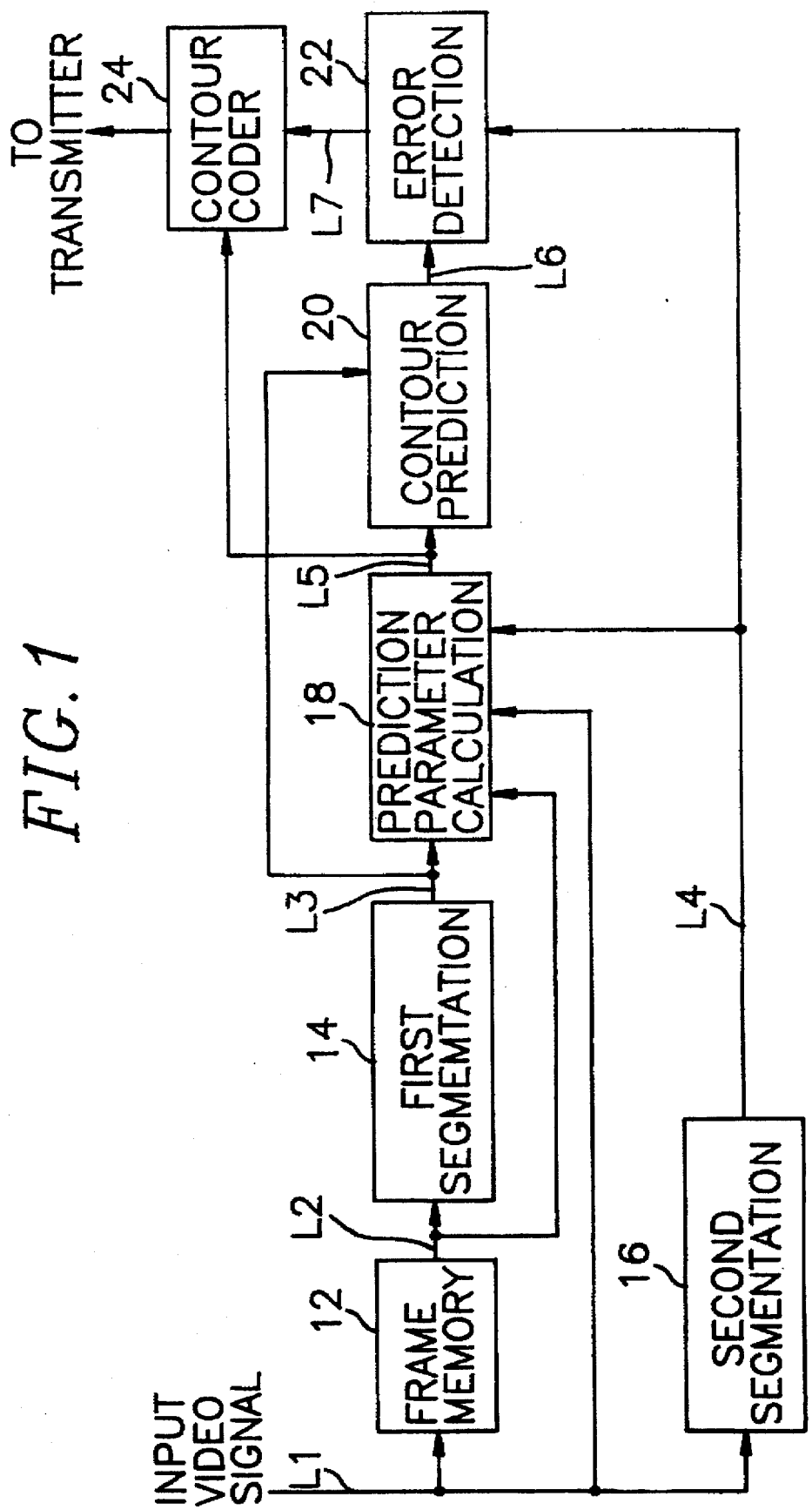
FIG. 1 represents a block diagram of a video signal encoding apparatus in accordance with a preferred embodiment of the present invention.

Referring to FIG. 1, there is shown a block diagram of the inventive apparatus for encoding a contour of regions contained in a video signal. An input video signal is fed, as a current frame signal, to a second segmentation block 16 and a prediction parameter calculation block 18 through a line L1; and is stored as a previous frame signal in a frame memory 12 which is connected to a first segmentation block 14 and the prediction parameter calculation block 18 through a line L2.

The first segmentation block 14 segments the previous frame retrieved from the frame memory 12 into a number of regions and generates a previous contour onto a line wherein the previous contour provides previous boundary information for tracing the boundary of the segmented regions of the previous frame, the previous boundary information including position data of the pixels along the boundary of the regions in the previous frame. The contour data representing the contour for the segmented regions on the line L3 from the first segmentation block 14 is provided to the prediction parameter calculation block 18 and a contour prediction block 20.

The second segmentation block 16 performs the same function as the first segmentation block 14, to thereby generate a current contour to the prediction parameter calculation block 18 and an error detection block 22. That is, the second segmentation block 16 segments the input video signal supplied thereto as the current frame signal into a number of regions and generates a current contour onto a line L4, wherein the current contour provides current boundary information for tracing the boundary of the segmented regions of the current frame, the current boundary information including position data of the pixels along the boundary of the regions in the current frame. The contour data representing the contour for the segmented regions on the line L4 from the second segmentation block 16 is provided to the prediction parameter calculation block 18 and the error detection block 22.

The prediction parameter calculation block 18 of the present invention determines a predetermined number of vertex points on the previous contour to produce vertex information representing the positions of the vertex points of the previous contour; and detects predicted vertex points based on a similarity calculation between the current and the previous frames through the use of vertex information and the current boundary information from the current contour to provide predicted vertex information representing the positions of the predicted vertex points. Thereafter, a known affine transform algorithm is carried out based on the vertex point information and the predicted vertex information, to thereby generate affine transform coefficients as prediction parameters. The prediction parameters are coupled through a line L5 to the contour prediction block 20 and a contour coder 24. Details of the prediction parameter calculation block 18 will be described hereinafter with reference to FIGS. 2 and 4. The contour prediction block 20 constructs a predicted current contour by affine transformation of the previous contour based on the prediction parameters. The predicted current contour from the contour prediction block 20 is coupled through a line L6 to the error detection block 22.

In accordance with the present invention, the error detection block 22 selects a number of points from the points on the predicted current contour as feature points by using a grid, and determines deviation points among the feature points, lying on portions of the predicted current contour that deviate from the current contour; and calculates a displacement for each of the deviation points, to thereby generate the deviation points, the displacements for the deviation points and a grid index, wherein each of the displacements represents a minimum distance in a horizontal direction between each of the deviation points and the current contour. The deviation points, the displacements for the deviation points and the grid index are then transmitted through a line L7 to the contour coder 24 for further processing. More details of the error detection block 22 will be described hereinafter with reference to FIGS. 3 and 5.

At the contour coder 24, the deviation points and the displacements for the deviation points are encoded together with the prediction parameters and the grid index by using, e.g., a binary arithmetic code of JPEG(Joint Photographic Experts Group). The encoded digital signal comprising the encoded deviation points, the displacements, the prediction parameters and the grid index is sent to a transmitter(not shown) for the transmission thereof.

Figure 2:
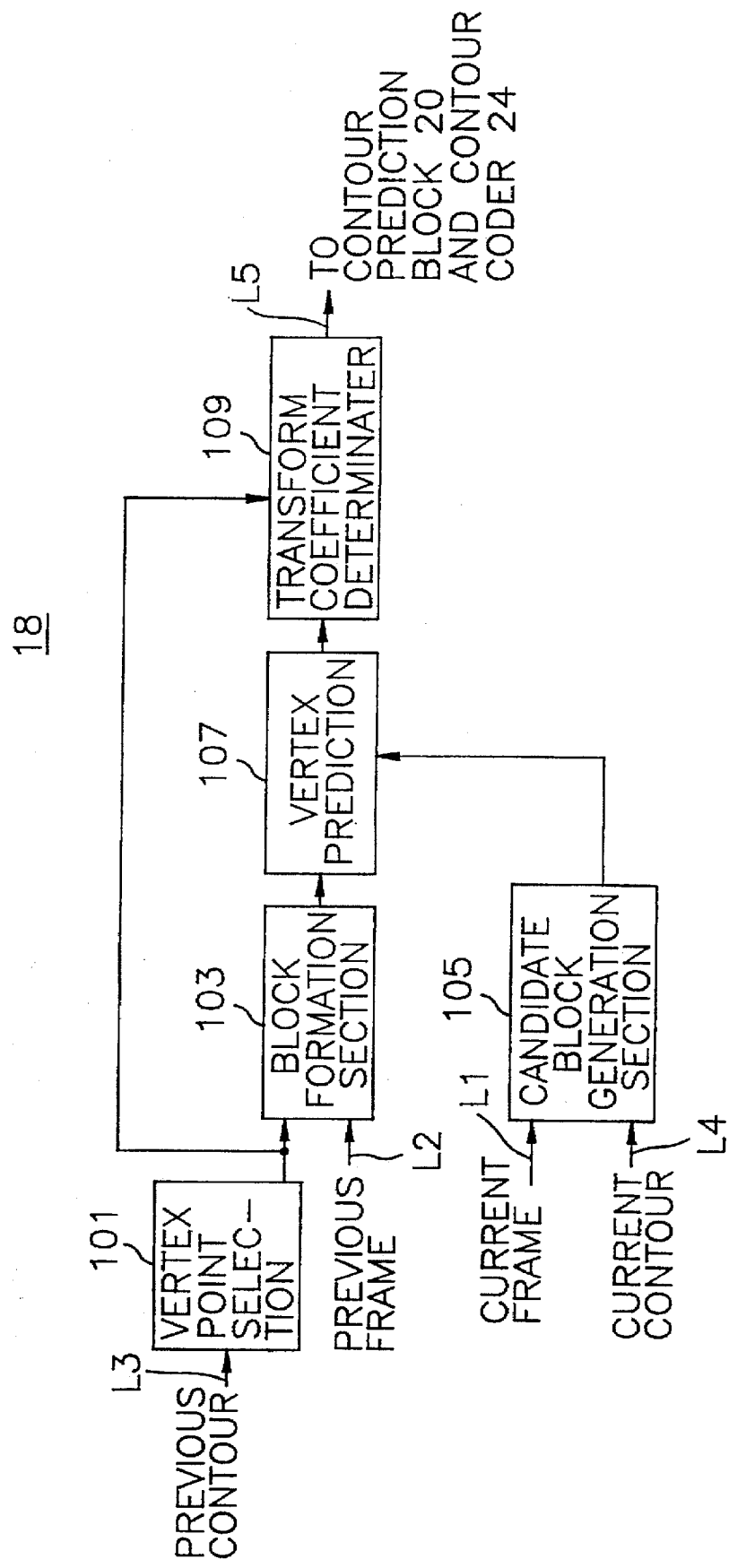
FIG. 2 presents a detailed block diagram of the prediction parameter calculation block shown in FIG. 1.

Referring now to FIG. 2, there is illustrated a detailed block diagram of the prediction parameter calculation block 18, shown in FIG. 1, for explaining the process for generating prediction parameters. The prediction parameter calculation block 18 includes a vertex point selection block 101, a block formation section 103, a candidate block generation section 105, a vertex prediction block 107 and a transform coefficient determinater 109.

Figure 4:
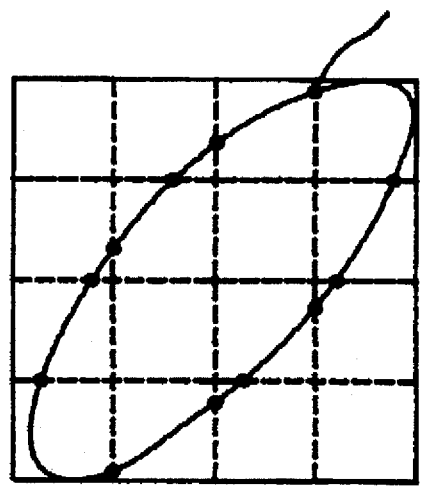
FIG. 4 describes a technique for selecting vertex points through the use of grids and contours.

As shown, the previous contour on the line L3 from the first segmentation block 14 is inputted to the vertex point selection block 101. The vertex point selection block 101 determines a predetermined number of points from the points on the previous contour as vertex points to generate vertex information representing the positions of the vertex points of the previous contour. In a preferred embodiment of the present invention, the vertex points are determined by using a known grid technique, which employs one of the various grid types, e.g., a rectangular grid, together with an edge detection technique as shown in FIG. 4. In this scheme, intersection points of the grid and the contour are selected as vertex points. The vertex information of the selected vertex points from the vertex point selection block 101 are inputted to the block formation section 103 and the transform coefficient determinater 109. At the block formation section 103, a vertex point block of, e.g., 8×8 pixels of the previous frame, having each of the vertex points at the center thereof, is retrieved via the line L2 from the frame memory 12 and provided to the vertex prediction block 107.

In the meanwhile, the input video signal on the line L1 is fed as the current frame signal to the candidate block generation section 105 and the current contour on the line L4 is also fed to the candidate block generation section 105. The candidate block generation section 105 defines a generally larger search region than the vertex point block of the current frame and generates therefrom a plurality of equal-sized candidate blocks to the vertex prediction block 107. In the preferred embodiment of the invention, the candidate blocks defined in the search region are chosen such that their center pixels form a part of the current contour, thereby placing the predicted vertex points on the current contour.

At the vertex prediction block 107, a motion vector for each of the vertex point blocks from the block formation section 103 is determined after a similarity calculation between the vertex point block and each of the plurality of candidate blocks included in the search region from the candidate block generation section 105, wherein each of the motion vectors represents a spatial displacement between a vertex point block in the previous frame and a most similar candidate block thereto in the current frame. The determined motion vector for the vertex point block is assigned as the motion vector of the vertex point contained in that vertex point blocks Thereafter, predicted vertex points are estimated based on the motion vectors for the vertex points and the predicted vertex information representing the positions of the predicted vertex points of the current contour are generated to the transform coefficient determinater 109. At the transform coefficient determinater 109, affine transform coefficients are determined by using an optimum motion parameter determination technique, disclosed in a commonly owned copending application, U.S. Ser. No. 08/502,228, entitled "METHOD FOR SEGMENTING AND ESTIMATING A MOVING OBJECT MOTION USING A HIERARCHY OF MOTION MODELS", based on the vertex information from the vertex point selection block 101 and the predicted vertex information from the vertex prediction block 107. The determined affine transform coefficients are then provided through the line L5 to the contour prediction block 20 and the contour coder 24 as the prediction parameters.

Figure 3:
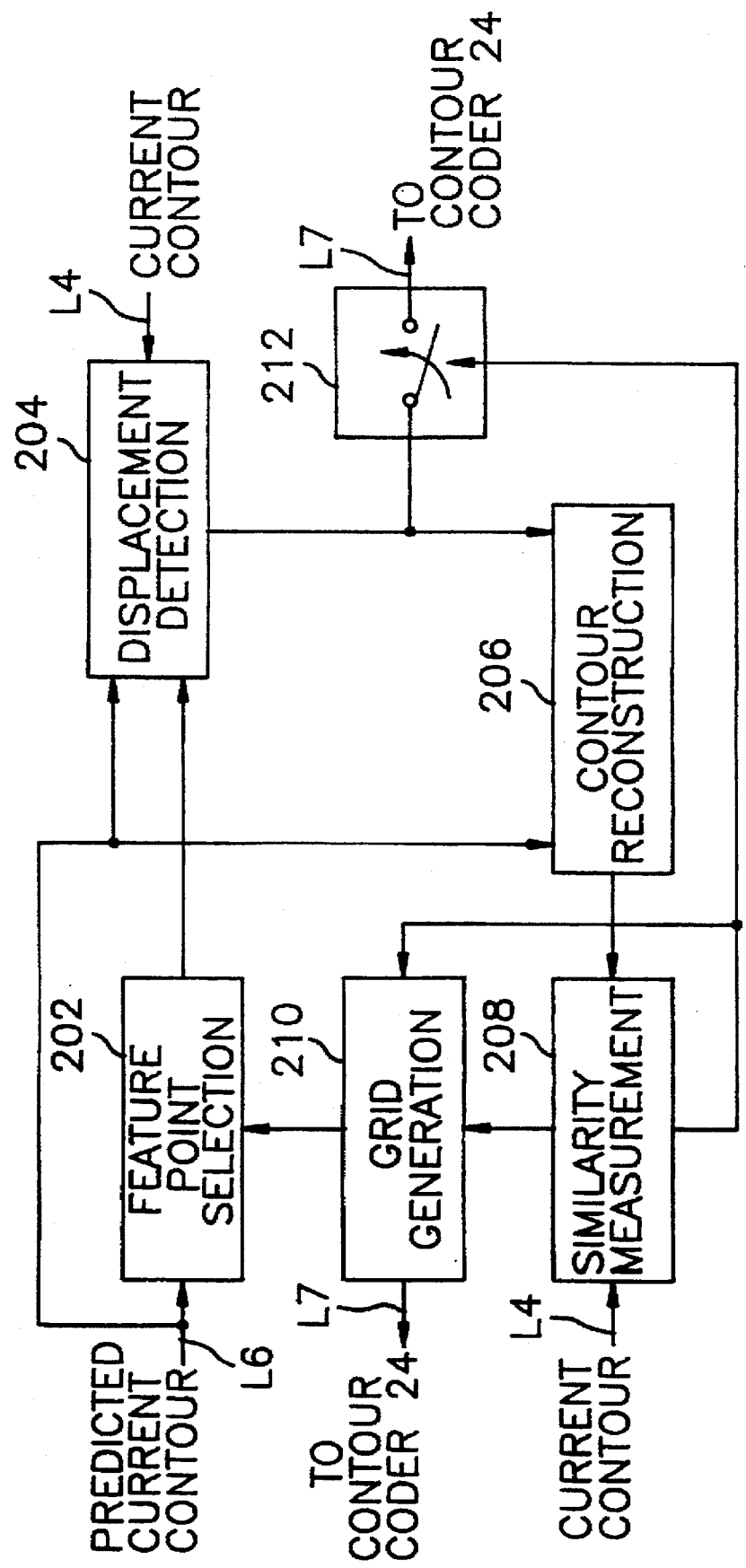
FIG. 3 shows a detailed block diagram of the error detection block shown in FIG. 1.

FIG. 3 depicts a detailed block diagram of the error detection block 22 shown in FIG. 1. The error detection block 22 is provided with a feature point selection block 202, a displacement detection block 204, a contour reconstruction block 206, a similarity measurement block 208, a grid generation block 210 and a switching block 212.

The grid generation block 210 serves to provide the feature point selection block 202 with grid information corresponding to one of a plurality of grids selected therein in response to each grid generation signal sequentially provided from the similarity measurement block 208, wherein each of the grids includes a number of grid lines, grid line densities for the grids being different from each other. A grid selected at the grid generation block 210 in response to a grid generation signal has a lower grid line density than a grid corresponding to a next grid generation signal. The current contour on the line L4 from the second segmentation block 16 is fed to the similarity measurement block 208. Upon receiving the current contour, the similarity measurement block 208 generates a first grid generation signal to the grid generation block 210. The grid generation block 210, in response to the first grid generation signal, selects, among the plurality of grids, a grid having a lowest grid line density to provide the feature point selection block 202 with grid information therefor.

Figure 5:
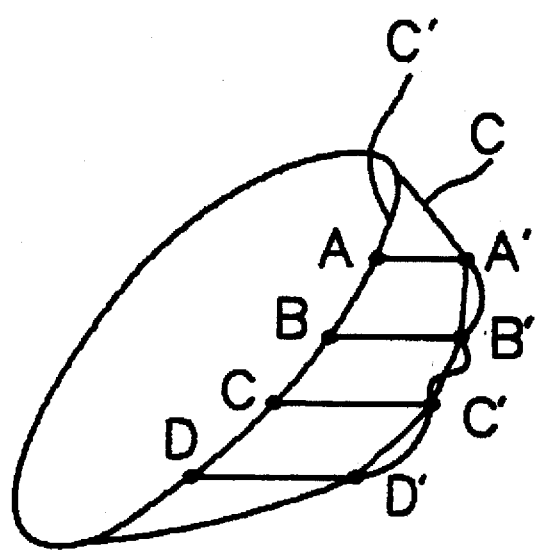
FIG. 5 illustrates an exemplary diagram for explaining a contour reconstruction process.

Meantime, the predicted current contour on the line L6 from the contour prediction block 20 is inputted to the feature point selection block 202, the displacement detection block 204 and the contour reconstruction block 206. The feature point selection block 202 determines a number of feature points on the predicted current contour by using the grid represented by the grid information provided from the grid generation block 210, wherein the feature points represent intersection points between the grid and the predicted current contour. The feature points selected from the feature point selection block 202 is fed to the displacement detection block 204. The current contour on the line L4 from the second segmentation block 16 is also inputted to the displacement detection block 204. At the displacement detection block 204, deviation points are determined among the feature points, lying on portions of the predicted current contour that deviate from the current contour, and the displacement for each of the deviation points is calculated. The deviation points and the displacements therefor are provided from the displacement detection block 204 to the contour reconstruction block 206 and the switching block 212. The contour reconstruction block 206 relocates the deviation points on the predicted current contour onto the current contour based on the displacement for each of the deviation points and generates a reconstructed current contour by joining the relocated deviation points on the current contour. The reconstructed current contour is provided from the contour reconstruction block 206 to the similarity measurement block 208 which also receives the current contour on the line L4 from the second segmentation block 16. FIG. 5 illustrates an exemplary diagram for explaining a contour reconstruction process. As shown, deviation points A to D on the predicted current contour C' are relocated onto the current contour C based on the displacement for each of the deviation points. Thereafter, the relocated deviation points A' to D' on the current contour C are joined together, thereby producing the reconstructed current contour.

Figure 6A:
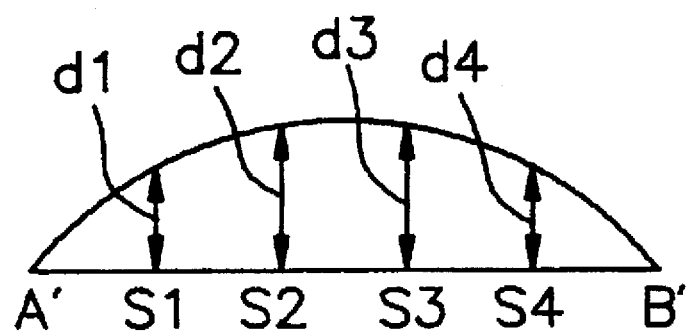
FIGS. 6A and 6B provide exemplary diagrams, each representing errors between a line segment joining two relocated deviation points and its corresponding current contour.
Figure 6B:
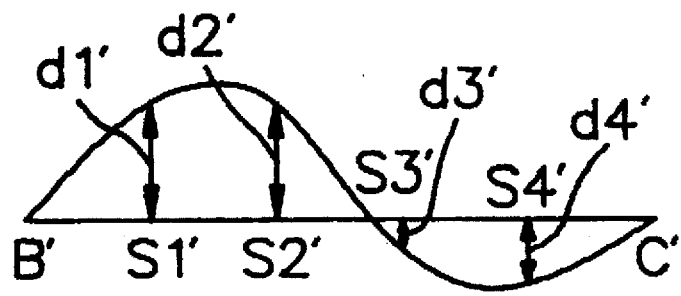

Referring back to FIG. 3, the similarity measurement block 208 provides N sample points for each line segment joining two neighboring relocated deviation points; and calculates an error for each of the N sample points on each of the line segments to produce a set of errors for each of the line segments, wherein the N sample points are equi-spaced on each of the line segments and each of the errors represents a distance between each of the N sample points and the current contour. FIGS. 6A and 6B illustrate exemplary diagrams representing errors between line segments and corresponding contour segments. Specifically, FIG. 6A depicts errors between the line segment A'B' and its corresponding contour segment and FIG. 6B shows errors between the line segment B'C' and its corresponding contour segment. Each of the errors d1 to d4 or d1' to d4' represents the distance from each of the sample points S1 to S4 on the line segment A'B' or S1' to S4' on the line segment B'C' to the corresponding contour segment. As can be seen from FIGS. 6A and 6B, the errors for the relocated deviation points are all "zeros". For all the relocated deviation points are positioned on the current contour.

In accordance with the invention, the similarity calculation block 208 sums up the set of errors in order to provide a similarity index. If the similarity index is larger than or equal to a predetermined threshold value, the similarity measurement block 208 generates a next, e.g., second grid generation signal to the grid generation block 210; otherwise, it generates a completion signal to the grid generation block 210 and the switching block 212. The switching block 212 relays the deviation points and the displacements to the contour coder 24 in response to the completion signal from the similarity measurement block 208.

The grid generation block 210 selects, in response to the next grid generation signal, a grid of a next lower grid line density and provides grid information therefor to the feature point selection block 202; and the error detection process described above is repeated with respect to the newly selected grid. On the other hand, if the completion signal is received, the grid generation block 210 generates to the contour coder 24 a grid index indicating the grid which yields the similarity index smaller than the predetermined threshold value.

As demonstrated above, therefore, the present invention is capable of substantially reducing the volume of transmission data for representing the contour of regions contained in a video signal by transmitting the prediction parameters together with the deviation information including the deviation points and the displacements for the deviation points.

While the present invention has been described with respect to the particular embodiments, it will be apparent to those skilled in the art that various changes and modifications may be made without departing from the spirit and scope of the invention as defined in the following claims.

What is claimed is:

1. An apparatus for encoding a contour of regions contained in a video signal, the video signal having a plurality of frames including a current frame and a previous frame, which comprises:

first segmentation means for segmenting the previous frame into a number of regions to generate a previous contour;

second segmentation means for segmenting the current frame into a number of regions to generate a current contour;

means for generating prediction parameters based on the previous and the current contours, and the previous and the current frames;

means for constructing a predicted current contour by transforming the previous contour based on the prediction parameters;

means for detecting deviation points lying on portions of the predicted current contour that deviate from the current contour, to thereby generate the deviation points and corresponding displacements to the deviation points, wherein each of the displacements represents a minimum distance in a horizontal direction between each of the deviation points and the current contour;

means for encoding the deviation points and the displacements together with the prediction parameters;

contour reconstruction means for relocating the deviation points based on the displacements and producing a reconstructed current contour from the predicted current contour;

means for taking N sample points on each of a plurality of line segments, each line segment joining two neighboring relocated deviation points on the reconstructed current contour, and calculating an error for each of the N sample points on each of the line segments to produce a set of errors for said each of the line segments, wherein the N sample points are equi-spaced on said each of the line segments and each of the errors represents a distance between each of the N sample points and the current contour;

means for summing up the set of errors to provide a similarity index;

control means for sequentially providing the feature point selection means with one or more grids until a similarity index obtained based on one of said one or more grids becomes smaller than a predetermined threshold value and generating a grid index indicating the grid related to the similarity index smaller than the predetermined threshold value; and means for encoding the grid index;

wherein said prediction parameter generation means includes:

means for determining a predetermined number of vertex points on the previous contour to generate vertex information representing the positions of the vertex points on the previous contour;

means for generating vertex point blocks from the previous frame based on the vertex information, each of the vertex point blocks having a vertex point at the center thereof;

means for defining a search region of the current frame and generating a plurality of equal-sized candidate blocks from the search region, each of the candidate blocks is chosen such that its center pixel is a pixel forming a part of the current contour;

means for detecting predicted vertex points by performing a block matching algorithm between a vertex point block and each of the plurality of candidate blocks to generate predicted vertex information representing the positions of the predicted vertex points; and means for generating the prediction parameters based on the vertex information and the predicted vertex information, and wherein said deviation point detection means includes:

feature point selection means for selecting a number of points from the points on the predicted current contour as feature points by using a grid, wherein the feature points represent intersection points between the grid and the predicted current contour; and means for determining the deviation points among the feature points, lying on portions of the predicted current contour that deviate from the current contour, and calculating the displacements for the deviation points, to thereby produce the deviation points and the corresponding displacements.

2. An apparatus for encoding a contour of regions contained in a video signal, the video signal having a plurality of frames including a current frame and a previous frame, which comprises:

first segmentation means for segmenting the previous frame into a number of regions to generate a previous contour;

second segmentation means for segmenting the current frame into a number of regions to generate a current contour;

means for generating prediction parameters based on the previous and the current contours, and the previous and the current frames;

means for constructing a predicted current contour by transforming the previous contour based on the prediction parameters;

a feature point selection means for selecting a number of points from the points on the predicted current contour as feature points by using a grid, wherein the feature points represent intersection points between the grid and the predicted current contour;

means for determining deviation points among the feature points, lying on portions of the predicted current contour that deviate from the current contour, and calculating displacements for the deviation points, wherein each of the displacements represents a minimum distance in a horizontal direction between each of the deviation points and the current contour;

means for relocating the deviation points based on the displacements and producing a reconstructed current contour from the predicted current contour;

means for taking N sample points on each of a plurality of line segments, each line segment joining two neighboring relocated deviation points on the reconstructed current contour, and calculating an error for each of the N sample points on each of the line segments to produce a set of errors for said each of the line segments, wherein the N sample points are equi-spaced on said each of the line segments and each of the errors represents a distance between each of the N sample points and the current contour;

means for summing up the set of errors to provide a similarity index;

control means for sequentially providing the feature point selection means with one or more grids until a similarity index obtained based on one of said one or more grids becomes smaller than a predetermined threshold value and generating a grid index indicating the grid related to the similarity index smaller than the predetermined threshold value; and means for encoding the deviation points, the displacements, the prediction parameters, and the grid index.

3. The apparatus according to claim 2, wherein said prediction parameter generation means includes:

means for determining a predetermined number of vertex points on the previous contour to generate vertex information representing the positions of the vertex points on the previous contour;

means for generating vertex point blocks from the previous frame based on the vertex information, each of the vertex point blocks having a vertex point at the center thereof;

means for defining a search region of the current frame and generating a plurality of equal-sized candidate blocks from the search region, each of the candidate blocks is chosen such that its center pixel is a pixel forming a part of the current contour;

means for detecting predicted vertex points by performing a block matching algorithm between a vertex point block and each of the plurality of candidate blocks to generate predicted vertex information representing the positions of the predicted vertex points; and means for generating the prediction parameters based on the vertex information and the predicted vertex information.

4. An apparatus for encoding a contour of regions contained in a video signal, the video signal having a plurality of frames including a current frame and a previous frame, which comprises:

first segmentation means for segmenting the previous frame into a number of regions to generate a previous contour;

second segmentation means for segmenting the current frame into a number of regions to generate a current contour;

means for generating prediction parameters based on the previous and the current contours, and the previous and the current frames;

means for constructing a predicted current contour by transforming the previous contour based on the prediction parameters;

means for detecting deviation points lying on portions of the predicted current contour that deviate from the current contour, to thereby generate the deviation points and corresponding displacements to the deviation points, wherein each of the displacements represents a minimum distance in a horizontal direction between each of the deviation points and the current contour;

means for encoding the deviation points and the displacements together with the prediction parameters;

contour reconstruction means for relocating the deviation points based on the displacements and producing a reconstructed current contour from the predicted current contour;

means for taking N sample points on each of a plurality of line segments, each line segment joining two neighboring relocated deviation points on the reconstructed current contour, and calculating an error for each of the N sample points on each of the line segments to produce a set of errors for said each of the line segments, wherein the N sample points are equi-spaced on said each of the line segments and each of the errors represents a distance between each of the N sample points and the current contour;

means for summing up the set of errors to provide a similarity index;

control means for sequentially providing the feature point selection means with one or more grids until a similarity index obtained based on one of said one or more grids becomes smaller than a predetermined threshold value and generating a grid index indicating the grid related to the similarity index smaller than the predetermined threshold value; and means for encoding the grid index.

5. The apparatus according to claim 4, wherein said prediction parameter generation means includes:

means for determining a predetermined number of vertex points on the previous contour to generate vertex information representing the positions of the vertex points on the previous contour;

means for generating vertex point blocks from the previous frame based on the vertex information, each of the vertex point blocks having a vertex point at the center thereof;

means for defining a search region of the current frame and generating a plurality of equal-sized candidate blocks from the search region, each of the candidate blocks is chosen such that its center pixel is a pixel forming a part of the current contour;

means for detecting predicted vertex points by performing a block matching algorithm between a vertex point block and each of the plurality of candidate blocks to generate predicted vertex information representing the positions of the predicted vertex points; and means for generating the prediction parameters based on the vertex information and the predicted vertex information.

6. The apparatus according to claim 4, wherein said deviation point detection means includes:

feature point selection means for selecting a number of points from the points on the predicted current contour as feature points by using a grid, wherein the feature points represent intersection points between the grid and the predicted current contour; and means for determining the deviation points among the feature points, lying on portions of the predicted current contour that deviate from the current contour, and calculating the displacements for the deviation points, to thereby produce the deviation points and the corresponding displacements.

* * * * *